United States Patent Office 2,916,827
Patented Dec. 15, 1959

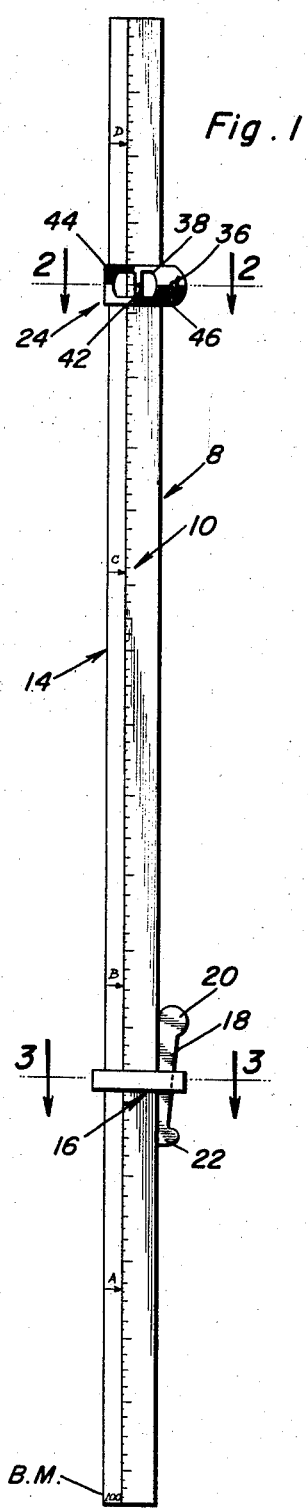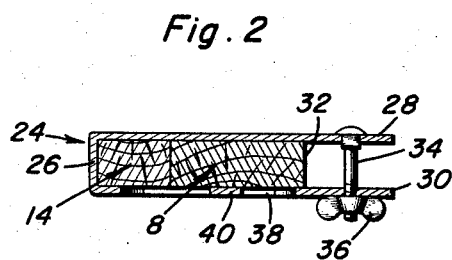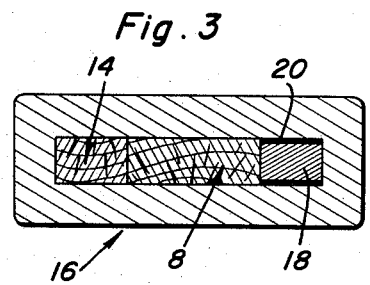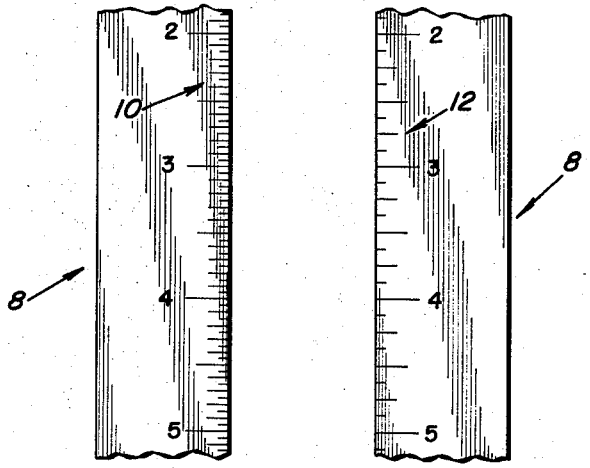
William C. Steindel
INVENTOR.

2,916,827
SURVEYING INSTRUMENT
William C. Steindel, Moscow, Pa.
Application October 24, 1956, Serial No. 618,015
1 Claim. (Cl. 33—74)

The present invention relates to certain new and useful improvements in a surveying instrument which is expressly designed to enable a user thereof to lay out certain job requirements involving various heights and elevations in building and construction work and has to do with a simple, economical structure which, despite its utter simplicity in design and construction, minimizes painstaking time and calculations involved in connection with excavations, footings, sills, pipes, drains and so on. As is generally well-known, any work assignment or job involving surveying and height finding usually requires the services of trained and often highly paid engineers and surveyors. On the other hand, many construction jobs, especially small and individual jobs, do not warrant hiring an engineer or one in his specialized field of employment. It follows that the present invention pertains to a simple but reliable and accurate instrument which lends itself to acceptable use by the contractor whose particular job does not call for the services of an engineer. To the end that these aims may be appropriately carried out the invention herein disclosed has been evolved and produced.

It follows that it is an object of the invention to provide a surveying and work facilitating instrument which may be used by an experienced but ordinary mechanic or supervised in use by the foreman on the job. In carrying out the concept a preferred embodiment thereof comprises a linearly straight primary measuring rod, an engineer's rule for example, having its surfaces provided with permanent scales graduated according to practice, a companion secondary rod also linearly straight slidingly abutting one lengthwise edge of the primary rod in a manner to cooperate with said scales, an assembling and retaining collar removably embracing said rods and having manually regulatable means removably and adjustably mounting said secondary rod on said primary rod and serving to permit said rods to be quickly adjusted, set, and held in intended relationship, and a manually regulatable target also embracing said rods, said target having a sight opening and an index cooperable with said scales and coordinating indicia and informative data on said secondary rod, the latter rod being specially marked for each given project and having blank surfaces on which the user may, with the use of a pencil, print or otherwise mark measurements and instructive data copied from blueprints or plans having to do with the individual job under consideration.

The invention features the above-named secondary rod which takes the form of a strip of wood, which as a matter of fact, may be cut out of available material right on the job and which after its full purposes have been served may be economically discarded. This feature or part of the invention is therefore designed for temporary or single-job use. However, and in accordance with the invention it may nevertheless be retained for such time as is required as a visible or "written" record for subsequent checking purposes at least until the job at hand has been not only laid out but satisfactorily completed.

The aforementioned collar comprises a rigid loop having an opening longer than the cross-section of said rods combinedly and providing a passage at one edge of one rod, said manually regulatable means comprising a wedge or key fitted into said passage and having knob-like finger-grips at its respective ends to facilitate handling the collar while the secondary rod is being attached, detached and/or adjusted and set for use.

In addition the target takes the form of a U-shaped clip which is readily applicable, removable and adjustable on the complemental rods. This clip is provided with a simple fastener connecting the ends of the arms and at least one of the arms of the clip has a sight-opening therein. The sight-opening in turn is provided with a centrally disposed member which is properly graduated to provide a scale and an index.

Other objects, features and advantages will become more readily apparent from the following description and the accompanying sheet of illustrative, but not restrictive drawings.

In the drawings wherein like numerals are employed to designate like parts throughout the views:

Figure 1 is a side elevational view of a surveying instrument constructed in accordance with the principles of the present invention.

Figures 2 and 3 are sections on the lines 2—2 and 3—3, respectively, of Figure 1.

Figures 4 and 5 are enlarged fragmentary views of the opposite selectively usable sides of the primary section or rod.

Referring now to the drawings the primary section or rod, which may be a linearly straight wooden stick or an equivalent member is denoted by the numeral 8. This is similar in construction, as is evident, to a so-called engineer's rule. Therefore, it is generally about six feet in length. It is properly marked, that is, provided with suitable scales. For example on one side there is a scale 10 and on the other side a scale 12. These scales may be laid out in feet, inches and fractions of inches as depicted for example in Figures 4 and 5. Abutting and slidingly and adjustably mounted along one longitudinal edge of the primary measuring rod 8 is a companion rod 14 which may be conveniently referred to here as a secondary rod. This is usually of lesser cross-section than the rod 8 and it may be, in practice, either longer or shorter than the rod 8 depending on the particular requirements of a given project or job. When combined in the manner seen in the drawings, the rods are assembled by way of clamp means. While this may be of some other construction it is preferably in the form of a simple sleeve-like collar 16, the opening of which is sufficient to accommodate not only the two rods 8 and 14 but also a complemental fastener. Here this takes the form of a key-like wedge 18 which as shown in Figure 1 is fitted into the passage or opening 20 at the end of the collar and which resides in friction binding contact with the cooperating edge of the rod 8. It is provided at its upper and lower ends with knob-like finger-grips 20 and 22 which also serve as stops in an obvious manner.

The clamping collar may be slipped over the ends of the rods or removed in the same manner thus expediting assembling and dismantling. With respect now to the target this is denoted by the numeral 24 and is a simple metal or equivalent U-shaped clip having a bight portion 26 and arms 28 and 30 which straddle the two rods in the manner shown in Figure 1 and extend beyond the edge 32. The extending end portions are provided with a bolt or an equivalent fastener 34 having an adjusting and clamping wing nut 36. At least one of the arms is provided with a sight opening 38 and this is such that it exposes cooperating co-planar faces of the rods in the manner shown. It is provided centrally with a cross member 40 which is appropriately graduated to provide a scale and also an index or indicating arrow or the like 42. The exterior surfaces of diagonally opposite upper and lower corner portions may be colored or shaded in the manner shown at 44 and 46 to expedite using the target.

As previously mentioned the instrument is to be used by contractors whose jobs do not call for the services of an engineer. However, an engineer may use the instrument and save appreciable time inasmuch as all points are established from a bench mark or other point of reference. All heights shown on a given set of prints are permanently set and marked on the temporarily usable plotting rod 14 for with the latter it is not necessary to refer to the bench or reference mark B.M. each time a new height or elevation is called for and for the reason that all heights are marked and established on the stated rod 14. Approximately all that is necessary is to change the location of the target 24 on the rod 8 to the desired point to be established. All of this can be done by an average mechanic.

The wooden rod 8 may be used separately for ascertaining and establishing level or grade points within certain limits inasmuch as the two rods are movable and both the target and clamp are also readily applicable and removable. To lay out in advance job requirement the rod 14 is provided with a bench mark B.M. which is usually given as 100. It follows that the rod 14 can obviously be laid out either in the office or on the job and all of the elevations checked thereon as they are transferred by use of a pencil from the blueprints or plans to available plain surfaces of the rod 14. It will be evident in this connection that each job or project therefore requires its own or a new rod 14 especially prepared to suit the requirements of the job at hand. In using the invention the bench mark is used as a place of orientation. The user measures to the nearest point given on the drawings, for instance, top of wall, top of floor, bottom of footing and so on keeping in mind that all other heights and elevations to be noted on the rod are to be done so in accordance with the showing on the plans or drawings and until all figures are registered or marked on the desired available space or surfaces of the rod. It follows too, that the rod provides the user with a permanent record of all heights and locations so that the same can be checked for error. In further using the device the user sets the transit or level (not shown) in a convenient location and sets the rod 8 on the bench mark for a reading. Next he clamps the secondary rod with its bench mark on this reading. The clamp with its wedge or key serves to bind the two rods together at the established setting. The target is set with the horizontal cross line on exactly the mark needed on the rod 2. Then the bottom of rod 8 should be the exact height at which the elevation exists. Where the transit or level is moved to a new location it is advisable to always check the reading from the bench mark and to set the rod 14 on the point or figure of this reading. The number of different heights or elevations that can be written or marked on the surfaces of the rod 14 is almost unlimited and once it is laid out there should be no further calculation on the project being worked on. It will be evident therefore that information from the blueprints and plans is transferred to intended and available surfaces on the rod 14. This makes it possible, as before stated, to lay out and mark the rod in the office where the estimates are made or right at the site of the job. Inasmuch as each job or project has different height and elevation requirements to take into consideration a separate rod 14 is employed for each job. For further guidance the name or number of each job or project can be noted on the rod 14. Not only this, once the rod is properly laid out, no further figuring and calculations are ordinarily found to be necessary. Then, too, the height and locations thereof are plainly visible. Hence, and as before stated, since the average mechanic, foreman or contractor may not have the training of a professional engineer and where the job does not warrant the expense of retaining one, a selected mechanic on the job, with the aid of this instrument, can bring about accurate and desirable results with a minimum of time and expense involved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

For use by workmen, a plotting instrument for laying out heights comprising a linearly straight primary measuring rod having relatively wide surfaces provided with suitably graduated permanent scales, a secondary rod also linearly straight, commensurate in length with said primary measuring rod and having a lengthwise edge thereof cooperatively and slidingly abutting a lengthwise edge of the primary rod and adapted to assist the user of the over-all instrument in his use of said scales, a rigid loop having an opening of a length greater than the combined cross-section of said rods, said loop removably embracing said rods and constituting an assembling and retaining collar for the rods, a manually regulatable wedge fitted in one end portion of the opening in said collar, said wedge being surrounded by the collar and also interposed beween an adjacent cooperating edge of the primary rod and cooperating portions of said collar, and a manually adjustable target comprising a U-shaped clip having spaced parallel arms connected together at like ends by a bight portion, said bight portion having sliding contact with an edge of said secondary rod, said arms embracing both of said rods and being provided with free end portions connected together by a fastener, at least one of said arms having a sight opening and means cooperating with said opening and providing an index, said secondary rod having normally blank "write-in" spaces which are filled in and otherwise suitably marked according to layout requirements of a given job, and said sight opening and index serving to simultaneously expose the graduations on the scales and certain of the cooperable filled in markings.

References Cited in the file of this patent

UNITED STATES PATENTS

| 47,824 | Horton | May 23, 1865 |
| 1,713,085 | Klitsche | May 14, 1929 |
| 1,735,892 | Clausen et al. | Nov. 19, 1929 |

FOREIGN PATENTS

| 250,840 | Switzerland | July 1, 1948 |